United States Patent [19]
Bajwa et al.

[11] Patent Number: 5,216,588
[45] Date of Patent: Jun. 1, 1993

[54] CHARGE PUMP WITH HIGH OUTPUT CURRENT

[75] Inventors: Asim A. Bajwa, San Jose; Christophe J. Chevallier, Mountain View, both of Calif.

[73] Assignee: Catalyst Semiconductor, Inc., Santa Clara, Calif.

[21] Appl. No.: 837,172

[22] Filed: Feb. 14, 1992

[51] Int. Cl.$^5$ .............................................. H02M 7/25
[52] U.S. Cl. ...................................... 363/60; 365/226
[58] Field of Search ................... 363/59, 60; 365/226

[56] References Cited

U.S. PATENT DOCUMENTS

| | | | |
|---|---|---|---|
| 4,199,805 | 4/1980 | Martinelli et al. | 363/60 |
| 4,302,804 | 11/1981 | Bader | 363/60 |
| 4,933,827 | 6/1990 | Olivo et al. | 363/60 |
| 4,962,512 | 10/1990 | Kiuchi | 363/60 X |
| 5,008,799 | 4/1991 | Montalvo | 363/60 |

Primary Examiner—Emanuel T. Voeltz
Attorney, Agent, or Firm—Skjerven, Morrill, MacPherson, Franklin & Friel

[57] ABSTRACT

A charge pump circuit is disclosed that enables the conversion of a low voltage to a higher voltage while delivering a substantial amount of current. The charge pump circuit includes a plurality of diode-capacitor voltage multiplier pump units connected in parallel with respect to each other. The plurality of pump units are switched at different times during the pump frequency to minimize noise generation. In one embodiment, the charge pump circuit is capable of delivering 8 mA of current.

6 Claims, 4 Drawing Sheets

CHARGE PUMP WITH HIGH OUTPUT CURRENT

BACKGROUND OF THE INVENTION

1. Field of the Invention

This invention relates to power converters and more particularly to charge pump circuits.

2. Description of the Relevant Art

Power converter circuits that convert a low voltage to a higher voltage are frequently required within electrical systems. One type of power converter circuit known as a charge pump typically includes a diode-capacitor voltage multiplier to achieve the voltage conversion.

A problem often associated with charge pump circuits is their low output current capability. Most charge pumps used in semiconductor devices produce only a small amount of current, typically less than 100 uA. If the circuit designer incorporates larger capacitors within the voltage multiplier of the charge pump in an effort to increase the output current capability, unacceptable noise can result due to the switching of the large capacitors. Thus, charge pump circuits have typically been limited to applications that require relatively low current.

SUMMARY OF THE INVENTION

In accordance with the present invention, a charge pump circuit is provided that enables the conversion of a low voltage to a higher voltage while delivering a substantial amount of current. The charge pump circuit includes a plurality of diode-capacitor voltage multiplier pump units connected in parallel with respect to each other. The plurality of pump units are switched at different times during the pump frequency to minimize noise generation. In one embodiment of the invention, the charge pump circuit is capable of delivering 8 mA of current.

These and other advantages are achieved with the present invention, in accordance with which a charge pump circuit comprises a first voltage pump unit including at least a first capacitor coupled to a voltage output line that is charged in response to a first clocking signal, and a second voltage pump unit including at least a second capacitor coupled to the voltage output line that is charged in response to a second clocking signal having an unequal phase relative to the first clocking signal.

In accordance with a second aspect of the invention, a charge pump circuit comprises a ring oscillator circuit for providing a plurality of clocking signals, each having an unequal phase with respect to the other. The charge pump circuit further comprises a plurality of clock control units, each coupled to receive a separate clocking signal from the ring oscillator circuit. A plurality of voltage pump units are each coupled to a separate clock control unit.

The invention will be more readily understood with reference to the drawings and the detailed description. As will be appreciated by one skilled in the art, the invention is applicable to charge pump circuits in general and is not limited to the specific embodiment disclosed.

DETAILED DESCRIPTION

The following includes a detailed description of the best presently contemplated mode for carrying out the invention. The description is intended to be merely illustrative of the invention and should not be taken in a limiting sense.

Figure 1:
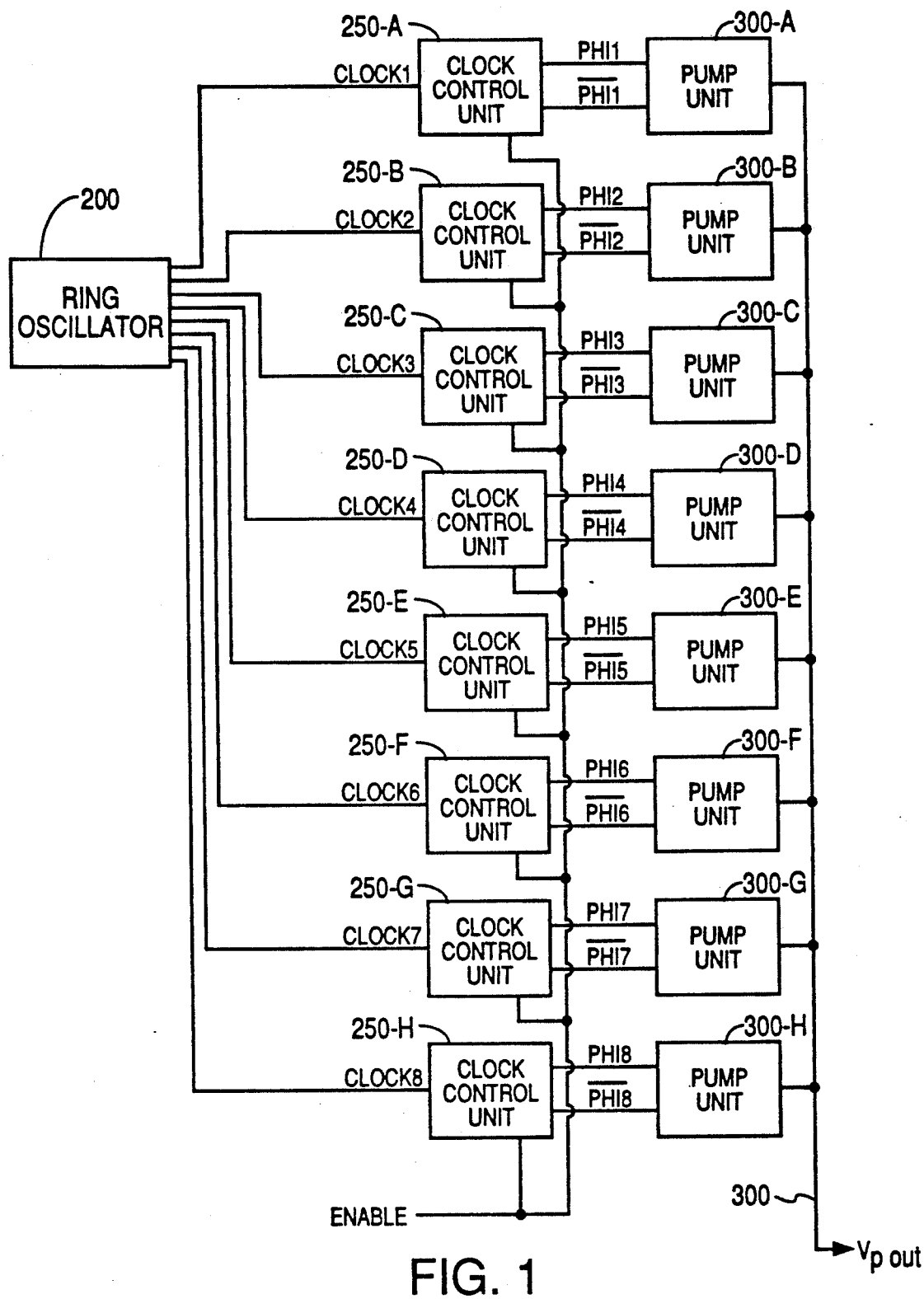
FIG. 1 is a block diagram illustrating a charge pump circuit in accordance with the present invention.

Referring first to FIG. 1, a block diagram is shown that illustrates a charge pump circuit in accordance with the present invention. The charge pump circuit includes a ring oscillator circuit 200, eight clock control units 250-A through 250-H, and eight voltage multiplier pump units 300-A through 300-H.

During operation, the ring oscillator circuit 200 generates eight clock signals CLOCK1-CLOCK8 each having an equal frequency and an unequal phase. As shown, a separate clock signal is provided to each of the clock control units 250-A through 250-H. The clock control units 250-A through 250-H generate signals PHI1-PHI8 that drive the pump units 300-A through 300-H respectively. The pump units 300-A through 300-H are connected in parallel and are implemented using diode-capacitor voltage multipliers to thereby generate a high voltage at output line 306. The ring oscillator 200 and clock control units 250A-250H are configured such that the pump units 300-A through 300-H are always switched at different times with respect to one another. Thus, large voltage spikes do not result. This operation will be better understood with reference to the schematic and timing diagrams of FIGS. 2-4.

Figure 2:
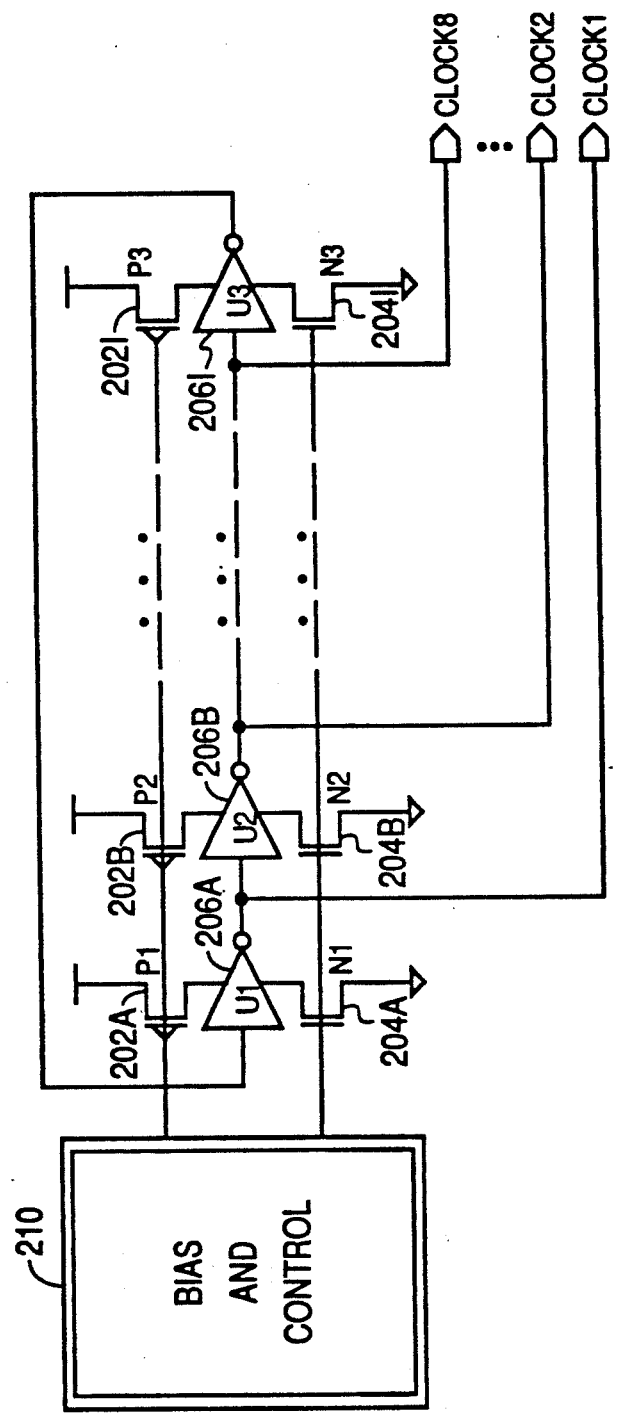
FIG. 2 is a schematic diagram illustrating an oscillator circuit with stepped clock signals.
Figure 3:
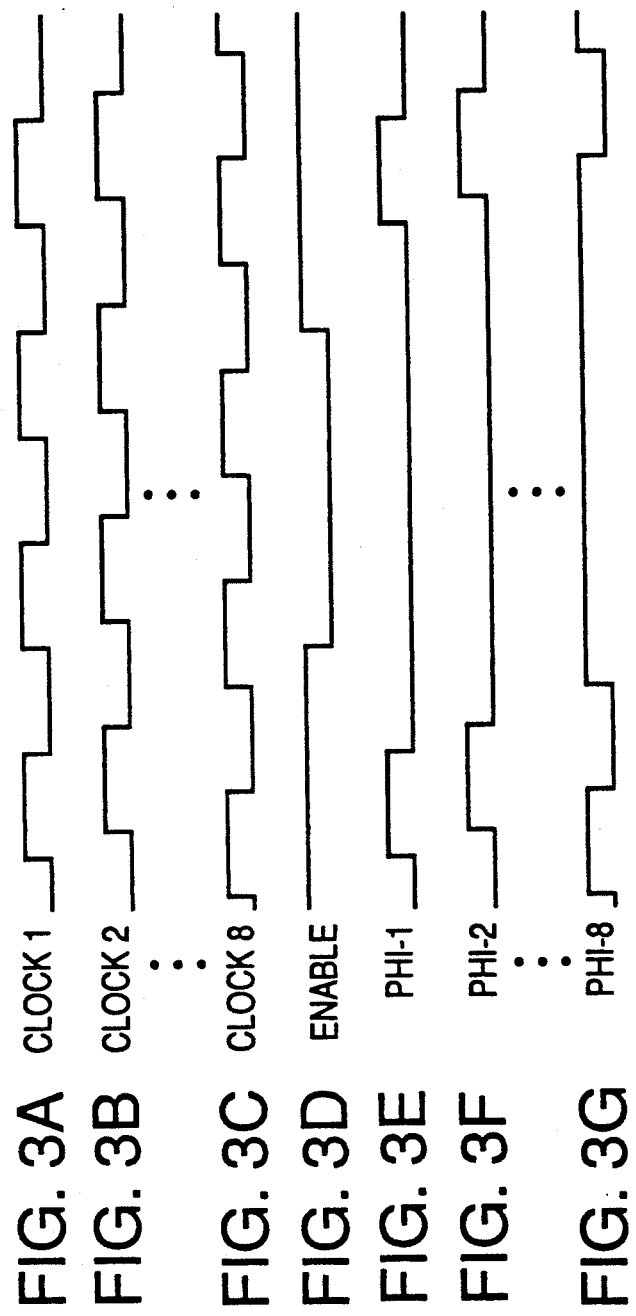
FIGS. 3A-3G are timing diagrams illustrating the stepped clock signals and the clock control unit output signals.

FIG. 2 is a schematic diagram that illustrates the ring oscillator circuit 200. The ring oscillator circuit includes nine P-channel field effect transistors 202-A through 202-I, nine N-channel field effect transistors 204-A through 204-I, and nine inverters 206-A through 206-I. The circuit further includes a bias and control unit 210.

FIGS. 3A-3C are timing diagram illustrating the clock signals CLOCK1, CLOCK2 and CLOCK8 generated by ring oscillator circuit 200. It is noted that the bias and control unit 210 is designed such that the generated clock signals CLOCK1-CLOCK8 have a desired pump frequency and that each of the clock signals CLOCK1-CLOCK8 are delayed with respect to one another due to inverters 206-A through 206-I. As mentioned previously and as shown in FIG. 1, a separate clock signal CLOCK1-CLOCK8 is provided to each of clock control units 250-A through 250-H.

Figure 4:
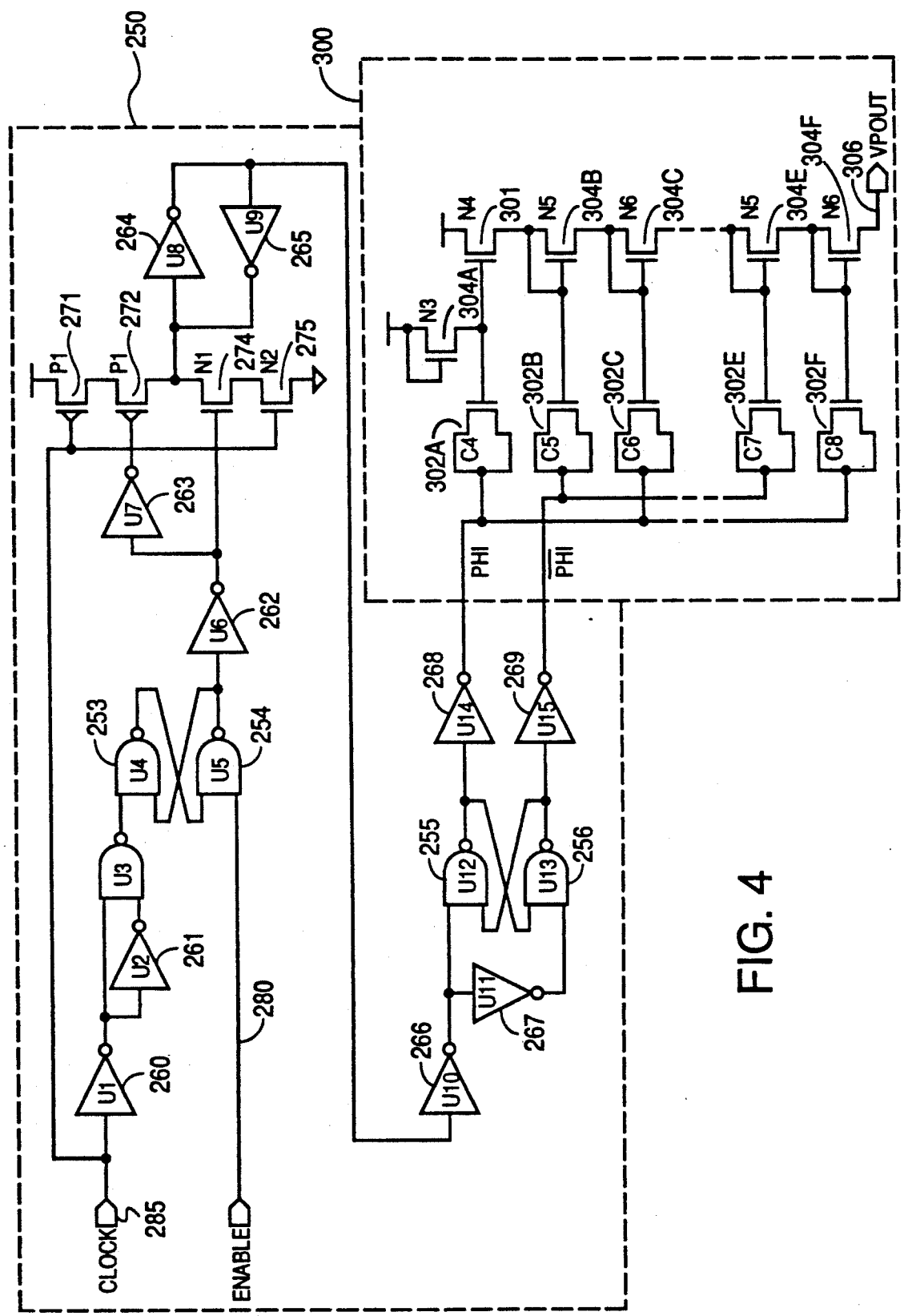
FIG. 4 is a schematic diagram illustrating a clock control unit and a pump unit incorporated within the charge pump circuit.

Referring next to FIG. 4, a schematic diagram is shown that includes a clock control unit 250 and a pump unit 300. It is noted that clock control unit 250 is representative of each of the clock control units 250-A through 250-H of FIG. 1 and that pump unit 300 is representative of each of the pump units 300-A through 300-H of FIG. 1.

The clock control unit 250 includes NAND gates 252-256, inverters 260-269, P-channel field effect transistors 271 and 272, and N-channel field effect transistors 274 and 275. The clock control unit 250 is enabled by an enable signal at line 280, and receives one of the clock signals CLOCK1-CLOCK8 at line 285.

The clock control unit 250 is disabled when the enable signal at line 280 is low and is enabled when the enable signal is high. As illustrated in FIGS. 3D-3G, the output signal PHI (i.e., one of signals PHI1-PHI8) of the corresponding clock control unit 250 follows the state of the associated clock signal CLOCK1-CLOCK8 when the ENABLE signal is high. When the ENABLE signal goes low, the state of the signal PHI cannot change. When the ENABLE signal returns high, the state of the signal PHI does not change states until a corresponding change occurs in the associated clock signal.

It is noted that a latch circuit consisting of inverters 264 and 265 is used to store the state of the clock signal when the ENABLE signal goes low. As is evident from the circuit diagram, when the ENABLE signal goes low, transistors 272 and 274 are both turned off. Thus, during this time, a change in the state of the clock signal does not change the state of inverters 264 and 265. A flip-flop circuit consisting of NAND gates 253 and 254 is used to release the latch circuit (inverters 264, 265) when the clock signal goes low following reassertion of the ENABLE signal. The falling edge of the clock signal is detected by inverters 260 and 261 and NAND gate 252. Inverters 266-269 and a flip-flop circuitry consisting of NAND gates 255 and 256 prevent overlap in the PHI and PHI signals.

The pump unit 300 includes a plurality of N-channel field effect transistors 301, 302A-302F and 304A-304F. It is noted that transistors 302A-302F are connected as capacitors and that transistors 304A-304F are connected as diodes. The circuit thus forms a diode-capacitor voltage multiplier.

During operation of the pump unit 300, signals PHI and PHI generated by the corresponding clock control unit 250 alternately charge the capacitances established by transistors 302A-302F. The discharge of the voltage across the capacitances is prevented since current cannot flow in a reverse direction through the diodes established by transistors 304A-304F. Accordingly, the voltage at output line 306 increases as the capacitances of transistors 302A-302F are charged.

It is noted that the pump unit 300 utilizes field effect transistors to implement the diode-capacitor voltage multipliers since the circuit is incorporated on an integrated circuit. The pump unit 300 could alternatively be implemented using actual capacitors and diodes. It is also noted that the number of diode-capacitor stages controls the overall voltage level charged at output line 306. The number of diode-capacitor stages utilized could be varied without departing from the scope of the invention.

Referring back to FIG. 1, since the signals PHI1--PHI8 are out of phase with respect to one another, the pump units 300-A through 300-H are each switched on and off at different times. Consequently, minimal noise is generated at output line 306 in relation to the current capacity.

Although the circuit of FIG. 1 includes eight pump units 300-A through 300-H, the invention is equally applicable to circuits having a greater or lesser number of pump units connected in parallel. The number of pump units chosen for a particular application will depend upon the current requirements and the component values.

Numerous modifications and variations will become apparent to those skilled in the art once the above disclosure is fully appreciated. It is to be understood that the above detailed description of the preferred embodiment is intended to be merely illustrative of the spirit and scope of the invention and should not be taken in a limiting sense. The scope of the claimed invention is better defined with reference to the following claims.

We claim:

1. A charge pump circuit comprising:
   a ring oscillator circuit for providing a plurality of clocking signals, each of said clocking signals having an unequal phase with respect to the others;
   a plurality of clock control units each coupled to receive a separate clocking signal from said ring oscillator circuit and for generating a corresponding pump control signal;
   a plurality of voltage pump units each coupled to a separate one of said plurality of clock control units and including means for generating a voltage output signal in response to said corresponding pump control signal; and
   a voltage output line coupled to each of said plurality of voltage pump units;
   wherein each of said clock control units further comprises a means to prevent a change in the state of said corresponding pump control signal when the separate clocking signal does not change states.

2. The charge pump circuit as recited in claim 1 wherein each of said clock control units further comprises a latch circuit to store a sate of the separate clocking signal when an enable signal provided to said enable input line goes low.

3. The charge pump circuit as recited in claim 2 wherein said means to prevent a change in the state of said corresponding pump control signal includes a flip-flop circuit to release said latch circuit when the separate clocking signal goes low.

4. The charge pump circuit as recited in claim 3 wherein each of said clock control units further comprises an edge detector circuit coupled to said flip-flop circuit for detecting a change of state of said separate clocking signal.

5. The charge voltage circuit as recited in claim 1 wherein each of said plurality of voltage pump units includes a diode-capacitor voltage multiplier.

6. The charge pump circuit as cited in claim 1 further including an enable input line for providing a signal for disabling said charge pump circuit.

* * * * *